US012583135B2

(12) United States Patent
Suto et al.

(10) Patent No.: US 12,583,135 B2
(45) Date of Patent: Mar. 24, 2026

(54) CUTTING DEVICE

(71) Applicant: Max Co., Ltd., Tokyo (JP)

(72) Inventors: Kohei Suto, Tokyo (JP); Takashi Morimura, Tokyo (JP); Kazunobu Yoshimura, Tokyo (JP); Shoma Sano, Tokyo (JP)

(73) Assignee: Max Co., Ltd., Tokyo (JP)

( * ) Notice: Subject to any disclaimer, the term of this patent is extended or adjusted under 35 U.S.C. 154(b) by 145 days.

(21) Appl. No.: 18/397,697

(22) Filed: Dec. 27, 2023

(65) Prior Publication Data

US 2024/0207952 A1 Jun. 27, 2024

(30) Foreign Application Priority Data

Dec. 27, 2022 (JP) ................................. 2022-210196
Dec. 27, 2022 (JP) ................................. 2022-210296
Dec. 27, 2022 (JP) ................................. 2022-210302
Dec. 27, 2022 (JP) ................................. 2022-210308
Dec. 27, 2022 (JP) ................................. 2022-210362
Dec. 27, 2022 (JP) ................................. 2022-210372

(Continued)

(51) Int. Cl.
*B23D 29/00* (2006.01)
*B23D 33/02* (2006.01)
(Continued)

(52) U.S. Cl.
CPC ........... *B23D 33/02* (2013.01); *B23D 29/002* (2013.01); *B26B 15/00* (2013.01); *B26B 29/04* (2013.01); *B26B 29/06* (2013.01)

(58) Field of Classification Search
CPC .. B23D 29/002; B23D 33/02; B23D 36/0008; B23D 17/04; B23D 29/005; B26B 29/04; B26B 29/06; B26B 15/00; A01G 3/037
(Continued)

(56) References Cited

U.S. PATENT DOCUMENTS 10,799,962 B2 10/2020 Barezzani et al.
2021/0339410 A1 11/2021 Hayashi et al.
(Continued)

FOREIGN PATENT DOCUMENTS

EP 1452280 A1 9/2004
EP 2540460 A1 * 1/2013 ............. A01G 3/037
(Continued)

OTHER PUBLICATIONS

May 23, 2024—(EP) Search Report—App 23220290.3.

*Primary Examiner* — Ghassem Alie

(74) *Attorney, Agent, or Firm* — Banner & Witcoff, Ltd.

(57) ABSTRACT

An electric cutting device includes: a pair of cutting blades configured to clamp and cut an object; an electric motor configured to generate a driving force necessary for operating the cutting blades; a controller configured to control an operation of the electric motor; an operation device configured to be switched between an ON state and an OFF state by a user operation; and a detector configured to: enter into an ON state in a case where the object is present between the pair of cutting blades; and enter into an OFF state in a case where the object is not present. The controller is configured to execute an operation of closing the pair of cutting blades in a case where both the operation device and the detector are in the ON state.

7 Claims, 10 Drawing Sheets

(30)        Foreign Application Priority Data

Dec. 27, 2022    (JP) ................................. 2022-210594
Dec. 27, 2022    (JP) ................................. 2022-210638

(51)  Int. Cl.
      *B26B 15/00*          (2006.01)
      *B26B 29/04*          (2006.01)
      *B26B 29/06*          (2006.01)
(58)  Field of Classification Search
      USPC ...... 83/72; 30/228, 245, 247–251, 254, 257,
                                              30/259, 233
      See application file for complete search history.

(56)              References Cited

U.S. PATENT DOCUMENTS

2022/0312680 A1    10/2022  Nii
2023/0403984 A1*   12/2023  Ma ......................... A01G 3/037

FOREIGN PATENT DOCUMENTS

EP            3466578 A1      4/2019
JP          2021-040594 A    3/2021
WO      WO-2005084416 A1 *   9/2005   ............. A01G 3/037
WO      WO-2006079668 A1 *   8/2006   ............. B26B 15/00
WO      WO-2012088695 A1 *   7/2012   ............. B26B 15/00

* cited by examiner

CUTTING DEVICE

CROSS-REFERENCE TO RELATED APPLICATIONS

The present application claims priority from Japanese Patent Application No. 2022-210196 filed on Dec. 27, 2022, Japanese Patent Application No. 2022-210296 filed on Dec. 27, 2022, Japanese Patent Application No. 2022-210302 filed on Dec. 27, 2022, Japanese Patent Application No. 2022-210308 filed on Dec. 27, 2022, Japanese Patent Application No. 2022-210362 filed on Dec. 27, 2022, Japanese Patent Application No. 2022-210372 filed on Dec. 27, 2022, Japanese Patent Application No. 2022-210594 filed on Dec. 27, 2022, and Japanese Patent Application No. 2022-210638 filed on Dec. 27, 2022, the entire contents of which are incorporated herein by reference.

TECHNICAL FIELD

The present disclosure relates to an electric cutting device.

BACKGROUND ART

As an electric cutting device, an electric pruning shear and the like as described in JP2021-40594A are known, for example. In an electric cutting device, cutting blades are operated by a driving force of an electric motor instead of a gripping force of a user, and cut an object to be cut by clamping the object with the pair of cutting blades. The above electric pruning shear is one in which a tree branch is set as an object to be cut, but a cutting device in which metal such as a reinforcing bar is set as the object to be cut is also known.

SUMMARY

A cutting device is often provided with a trigger switch or the like that is operated by a finger of a user, for example, as a switch for starting an operation of a cutting blade. However, for example, in a state where an object to be cut is not inserted into an appropriate position between cutting blades, it is not preferable to operate the cutting blades even if the trigger switch is turned on by the user.

Illustrative aspects of the present disclosure provide a cutting device that does not start cutting an object to be cut when a positional relationship between a cutting blade and the object to be cut is inappropriate.

An electric cutting device according to one illustrative aspect of the present disclosure includes: a pair of cutting blades configured to clamp and cut an object; an electric motor configured to generate a driving force necessary for operating the cutting blades; a controller configured to control an operation of the electric motor; an operation device configured to be switched between an ON state and an OFF state by a user operation; and a detector configured to: enter into an ON state in a case where the object is present between the pair of cutting blades; and enter into an OFF state in a case where the object is not present. The controller is configured to execute an operation of closing the pair of cutting blades in a case where both the operation device and the detector are in the ON state.

In the cutting device configured as described above, the operation device operated by the user is provided separately from the detector that is configured to enter into an ON state in the case where the object is present between the pair of cutting blades and to enter into an OFF state in the case where the object is not present. The controller executes an operation of closing the pair of cutting blades in the case where both the operation device and the detector are in the ON state.

In a state where the object is not placed at an appropriate position, since the detector enters into the OFF state, the cutting blades do not operate even if the operation device is turned on. Accordingly, it is possible to prevent a situation in which the operation of the cutting blades is started while a positional relationship between the cutting blades and the object is inappropriate.

Even when the object is placed at an appropriate position and the detector enters into the ON state, the cutting blades still do not operate if the operation device is kept in the OFF state. Accordingly, it is possible to prevent a situation in which a cutting portion operates against the will of the user.

According to the present disclosure, a cutting device that does not start cutting an object when a positional relationship between a cutting blade and the object is inappropriate is provided.

DESCRIPTION OF EMBODIMENTS

Figure 1:
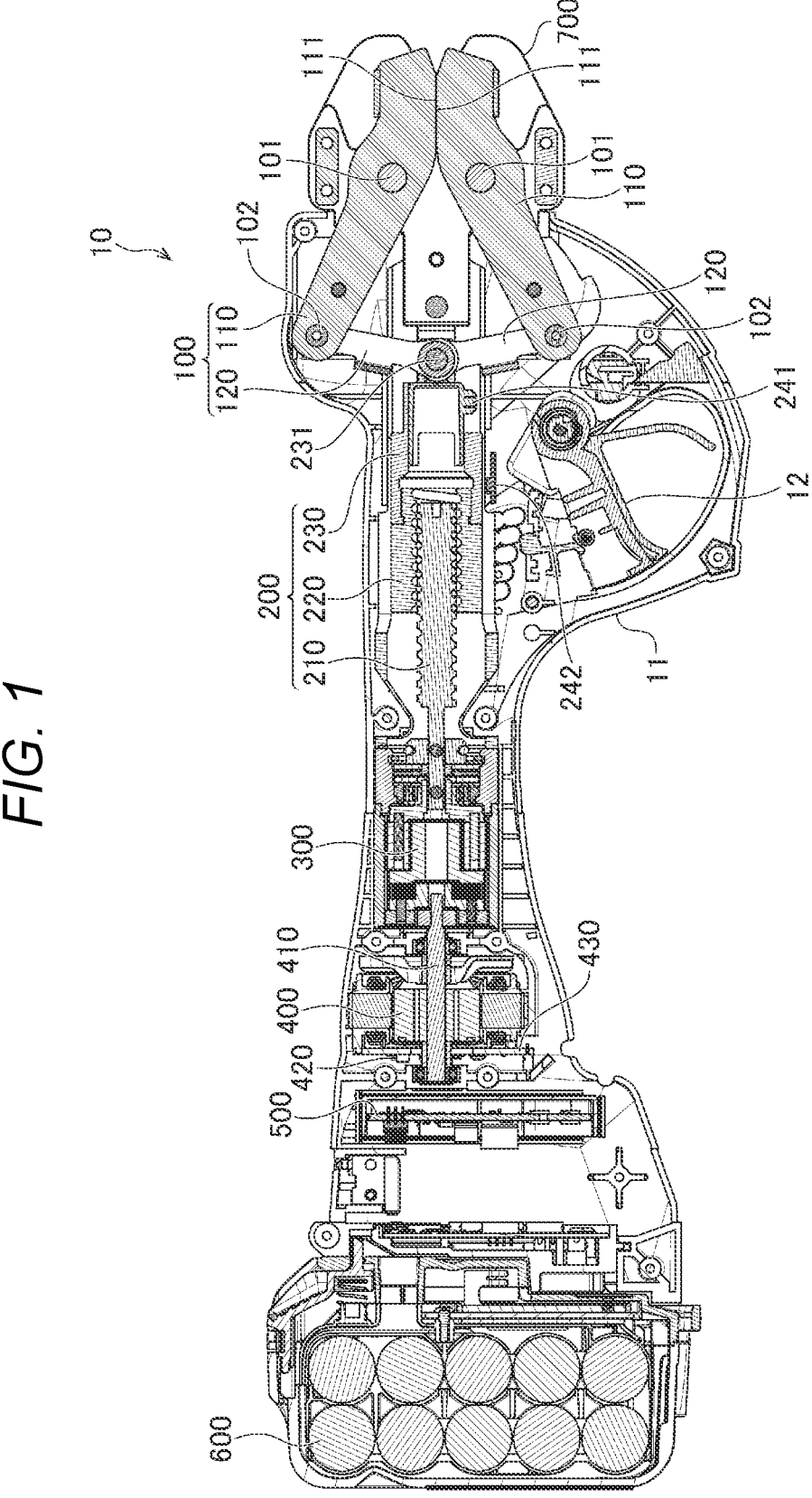
FIG. 1 is a diagram showing a configuration of a cutting device according to a first illustrative embodiment.

The present illustrative embodiment will be described below with reference to the accompanying drawings. In order to facilitate understanding of the description, the same components are denoted by the same reference numerals as much as possible in the drawings, and redundant descriptions will be omitted.

A first illustrative embodiment will be described. A cutting device 10 according to the present illustrative embodiment is an electric cutting device, and is configured as a device for cutting a reinforcing bar at a construction site or the like. A configuration of the cutting device 10 will be described mainly with reference to FIG. 1. The cutting device 10 includes a housing 11, a trigger switch 12, a cutting mechanism 100, a ball screw 200, a speed reducer 300, an electric motor 400, a control board 500, and a storage battery 600. In addition to these components, the cutting device 10 also includes a detection unit 800 (see FIG. 3), but showing thereof is omitted in FIG. 1.

The housing 11 is a container that defines an outer shape of the cutting device 10. The housing 11 is made of resin, for example. The ball screw 200 described later, the speed reducer 300 described later, and the like are housed inside the housing 11. In FIG. 1, a portion of the housing 11 on a front side when viewed on paper is removed, and an internal configuration of the cutting device 10 is shown as a cross-sectional view.

The trigger switch 12 is a switch operated by a finger of a user. The user can turn on the trigger switch 12 by placing his or her finger on the trigger switch 12 and pulling the trigger switch 12 to the front side. When the user loosens his or her finger, the trigger switch 12 returns to an original position due to a force of a spring, and enters into the OFF state. When the trigger switch 12 is switched between an ON state and the OFF state, a corresponding signal is transmitted to the control board 500 described later. The trigger switch 12 corresponds to an "operation unit" that can be switched between the ON state and the OFF state by an operation performed by the user. As will be described later, the user turns on the trigger switch 12 as one of the operations necessary to start cutting the reinforcing bar.

The cutting mechanism 100 is a portion configured to cut the reinforcing bar which is an object to be cut. The cutting mechanism 100 includes a pair of blade members 110 and a pair of link members 120.

The cutting blades 111 configured to clamp and cut the object to be cut are formed on the respective blade members 110. The blade member 110 is held pivotally about a shaft 101 fixed to the housing 11. In the present illustrative embodiment, the respective blade members 110 are arranged to face each other such that ridge lines of blade edges of the cutting blades 111 operate on trajectories passing through substantially the same plane. Accordingly, it is possible to switch between an opened state where the respective cutting blades 111 are spaced apart from each other and a closed state where the respective cutting blades 111 come into contact with (or close to) each other. In the example of FIG. 1, the pair of cutting blades 111 are in the closed state.

Each link member 120 is a rod-shaped member, and one end of the link member 120 is connected to the blade member 110 via a shaft 102, and the other end of the link member 120 is connected to a connection member 230 described later via a shaft 231. The link member 120 and the blade member 110 are connected to each other in a manner of pivoting about the shaft 102. Similarly, the link member 120 and the connection member 230 are connected to each other in a manner of pivoting about the shaft 231. As will be described later, the connection member 230 moves in a left-right direction in FIG. 1 by a driving force of the electric motor 400.

If the connection member 230 moves in a left direction from the state shown in FIG. 1, the blade member 110 on an upper side of FIG. 1 pivots counterclockwise, and the blade member 110 on a lower side of FIG. 1 pivots clockwise. Accordingly, the pair of cutting blades 111 change from the closed state to the opened state. On the other hand, when the pair of cutting blades 111 are in the opened state, if the connection member 230 moves in the right direction in FIG. 1, the blade member 110 on the upper side of FIG. 1 pivots clockwise, and the blade member 110 on the lower side of FIG. 1 pivots counterclockwise. Accordingly, the pair of cutting blades 111 return to the closed state. Accordingly, the pair of blade members 110, the pair of link members 120, and the connection member 230 as a whole configure a so-called "toggle link mechanism".

Figure 2:
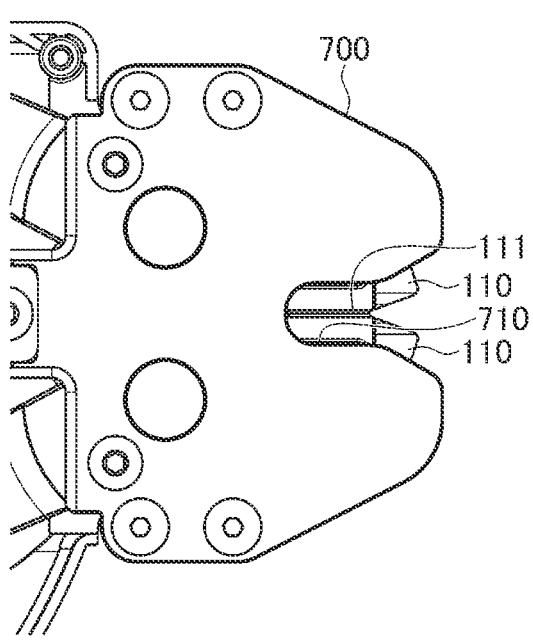
FIG. 2 is a diagram showing a configuration of guide plates included in the cutting device according to the first illustrative embodiment.

In the present illustrative embodiment, a pair of guide plates 700 are provided near the blade members 110. The guide plates 700 are plate-shaped members made of metal, and are disposed to sandwich the blade members 110 from both the front side and the back side in FIG. 1 when viewed on paper. Shapes of the pair of guide plates 700 are substantially the same. As shown in FIG. 2, each guide plate 700 has a recess 710 formed therein.

For convenience of description, a right side in FIG. 1 will also be referred to as a "front end side" below, and a left side in FIG. 1 will be referred to as a "rear end side" below. The recess 710 is formed to recede from the front end side toward the rear end side of the guide plate 700. When the cutting device 10 is viewed from a side as shown in FIGS. 1 and 2, each recess 710 is formed at a position that includes the cutting blade 111 in the closed state. In the standby state where the cutting blades 111 are fully opened, the cutting blades 111 are retracted to the outside of the recesses 710, and from a perspective of FIG. 2, the entire blade members 110 are hidden by the guide plates 700. The guide plates 700 have both a function of covering and protecting the cutting blades 111 in the standby state, and a function of guiding the reinforcing bar, which is the object to be cut, along the recesses 710 between the pair of cutting blades 111. The guide plates 700 further have a function of stabilizing a posture of the cutting device 10 before and after cutting by sandwiching the reinforcing bar in the recesses 710.

The ball screw 200 is a device for converting a rotational movement of the electric motor 400 into a linear movement of the connection member 230, thereby causing the cutting mechanism 100 to operate. The ball screw 200 includes a screw shaft 210, a nut 220, and the connection member 230.

The screw shaft 210 is a rod-shaped member that extends linearly from the rear end side to the front end side. A male screw is formed on an outer peripheral surface of the screw shaft 210. When the electric motor 400 is driven, the screw shaft 210 rotates about a central axis thereof.

The nut 220 is a substantially cylindrical member disposed to surround the screw shaft 210 from an outer peripheral side. A female screw is formed on an inner peripheral surface of the nut 220, and is screwed to the male screw formed on the outer peripheral surface of the screw shaft 210. While the nut 220 is allowed to move along a longitudinal direction of the screw shaft 210, rotation about the central axis of the screw shaft 210 is restricted. Therefore, when the screw shaft 210 rotates about the central axis thereof, the nut 220 moves in the left-right direction in FIG. 1 along the central axis.

The connection member 230 is a member attached to the nut 220 and is a member that moves along the screw shaft 210 together with the nut 220. The connection member 230 is attached in a manner of protruding from the nut 220 toward the front end side. The pair of link members 120 are connected to a portion of the connection member 230 near an end on the front end side via the shaft 231 described above.

A magnet 241 is attached to the outer peripheral surface of the connection member 230. A Hall sensor 242 is attached to the housing 11 at a position near the connection member 230. The position where the Hall sensor 242 is attached is such that when the nut 220 moves to a rear end from the state shown in FIG. 1 and the cutting blades 111 are fully opened, the Hall sensor 242 faces the magnet 241 of the connection member 230. When the cutting blades 111 are fully opened, a signal is transmitted from the Hall sensor 242 by facing the magnet 241, and the signal is input to the control board 500.

The speed reducer 300 is a device that is configured to reduce a rotation speed of an output shaft 410 of the electric motor 400 and then transmit the rotation to the screw shaft 210 of the ball screw 200.

The electric motor 400 is a rotating electrical machine for generating a driving force necessary for operating the cutting blades 111, and is, for example, a brushless DC motor. The electric motor 400 has the output shaft 410. The output shaft 410 is a substantially cylindrical member. A central axis of the output shaft 410 coincides with the central axis of the screw shaft 210. A part of the output shaft 410 protrudes toward the speed reducer 300 and is connected to the speed reducer 300.

When current is supplied to a coil of the electric motor 400, the output shaft 410 rotates about the central axis thereof. The rotation of the output shaft 410 is transmitted to the screw shaft 210 via the speed reducer 300, and causes the nut 220 to move toward the front end side or the rear end side. Accordingly, the cutting blades 111 of the cutting mechanism 100 are operated to open and close as described above.

A rotation sensor 420 is provided inside the electric motor 400. The rotation sensor 420 is configured to emit a pulse signal every time the output shaft 410 rotates by a predetermined angle. The rotation sensor 420 is provided on a board 430 included in the electric motor 400. The pulse signal from the rotation sensor 420 is transmitted to the control board 500. By counting the number of pulse signals, the control board 500 is able to know a rotation angle of the output shaft 410 after a specific timing. The control board 500 is also able to know the rotation speed of the output shaft 410 based on the number of pulse signals input per unit time. The rotation sensor 420 may be a different type of a sensor from that of the present illustrative embodiment, or may be a sensor separately provided at a position different from the electric motor 400 as long as the sensor can measure the rotation angle and the rotation speed of the output shaft 410.

The control board 500 is a circuit board provided to control an overall operation of the cutting device 10 including the electric motor 400. The control board 500 includes an inverter circuit for adjusting current supplied to the electric motor 400, a microcomputer for controlling a switching operation and the like in the inverter circuit, and the like.

The storage battery 600 stores electric power necessary for operating the electric motor 400 and the control board 500, and is, for example, a lithium ion battery. In the cutting device 10, a portion in which the storage battery 600 is detachable from the housing 11 as a battery pack, and is connected to and charged by an external charger. Instead of such an aspect, a configuration may be adopted in which the storage battery 600 can be charged while the storage battery 600 is attached to the housing 11.

Figure 3:
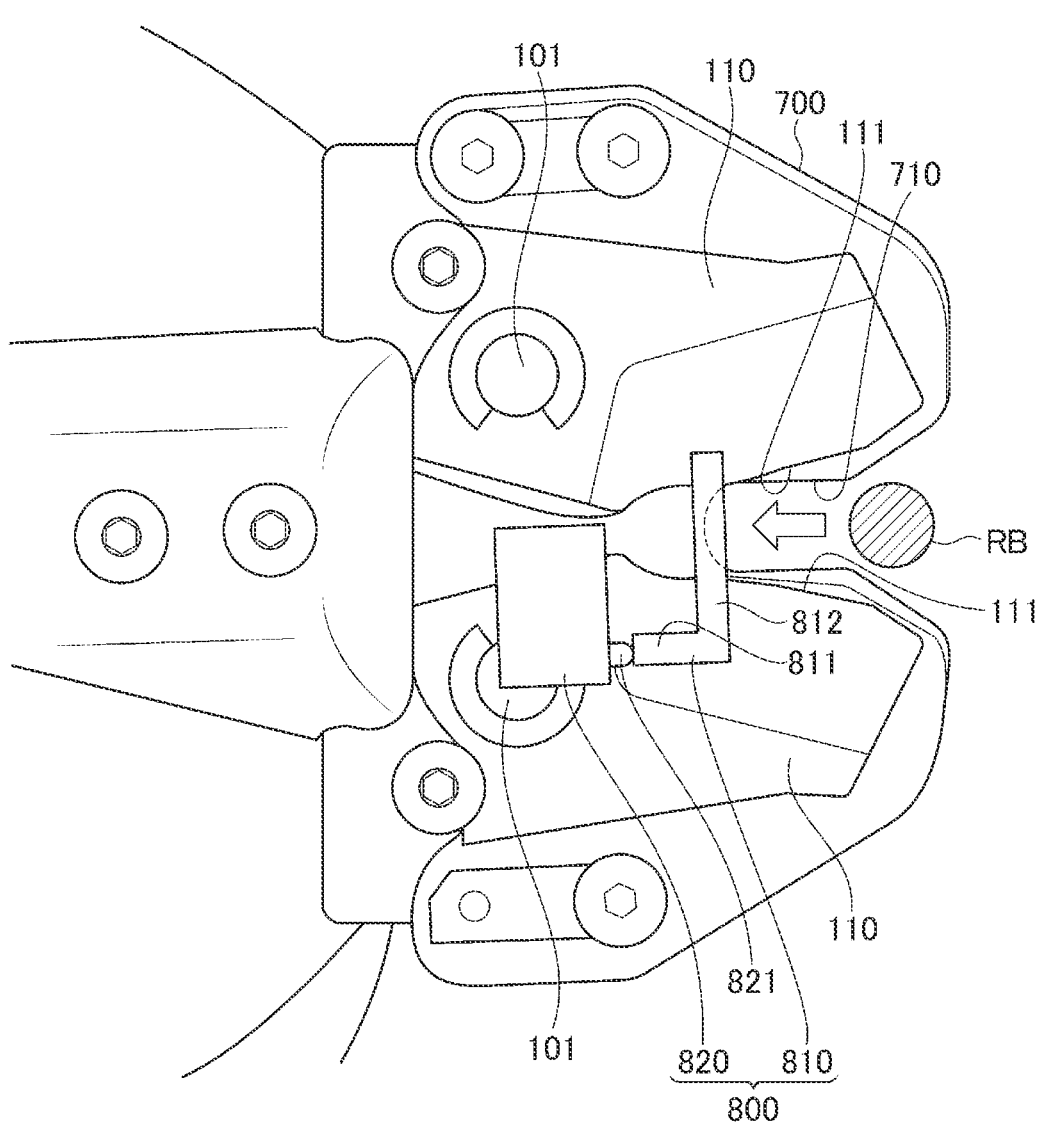
FIG. 3 is a diagram showing a configuration of a detection unit included in the cutting device according to the first illustrative embodiment.

As shown in FIG. 3, the detection unit 800 is provided at a position near the cutting blades 111. The detection unit 800 is a switch for detecting the object to be cut. The detection unit 800 is configured to enter into an ON state if a reinforcing bar RB is present at a predetermined position between the pair of cutting blades 111, and to enter into an OFF state if the reinforcing bar RB is not present. The detection unit 800 includes an actuating unit 810 and a switch 820.

The actuating unit 810 is a unit held by, for example, the guide plates 700 in a state that the actuating unit 810 is movable in a direction parallel to the central axis of the screw shaft 210. The actuating unit 810 includes a first portion 811 and a second portion 812. The first portion 811 is a portion that extends linearly parallel to the central axis of the screw shaft 210. The second portion 812 is a portion that extends linearly from an end portion on the front end side of the first portion 811 in a direction perpendicular to the first portion 811.

In a state where the reinforcing bar RB does not touch the actuating unit 810 as shown in FIG. 3, the second portion 812 is in a position overlapping a part of each recess 710 in a side view. Specifically, the second portion 812 overlaps a portion of each recess 710 near the rear end side.

The position of the actuating unit 810 shown in FIG. 3 is a position closest to the front end side within a movable range thereof. When the cutting device 10 is moved toward the reinforcing bar RB from the state shown in FIG. 3, the reinforcing bar RB moves relatively to a back side of the recess 710. That is, the reinforcing bar RB comes into contact with the second portion 812 on the way, and thereafter moves to the back side (rear end side) together with the actuating unit 810. Eventually, the reinforcing bar RB moves to an innermost position of each recess 710. At a time point when the reinforcing bar RB reaches the back side of the recess 710, the actuating unit 810 is at the rearmost position within the movable range thereof. In this way, the actuating unit 810 comes into contact with the reinforcing bar RB inserted between the pair of cutting blades 111, and operates in response to a force from the reinforcing bar RB.

The switch 820 is a portion that is configured to convert the actuation of the actuating unit 810 into an electrical signal. The switch 820 is held by, for example, the guide plates 700 at a position on the rear end side of the actuating unit 810. The switch 820 includes a movable portion 821. The movable portion 821 protrudes from a main body portion toward a front end side of the switch 820, and a front end of the movable portion 821 abuts an end portion on the rear end side of the first portion 811. The movable portion 821 is urged toward the front end side by a spring (not shown).

In the state shown in FIG. 3, the switch 820 of the detection unit 800 is in the OFF state. As described above, when the reinforcing bar RB moves to the back side of the recess 710 and the actuating unit 810 moves to the rear end side by the force from the reinforcing bar RB, the force from the first portion 811 pushes the movable portion 821 toward the rear end side. Accordingly, the switch 820 changes from the OFF state to the ON state. Then, when cutting of the reinforcing bar RB is completed and the reinforcing bar RB is not present in the recess 710, the switch 820 returns to the OFF state. When the switch 820 is switched between the ON state and the OFF state, a corresponding signal is transmitted to the control board 500 described later. As will be described later, the control board 500 starts the operation of the cutting blades 111 only when both the trigger switch 12 (operation unit) and the detection unit 800 are turned on.

As described above, the detection unit 800 according to the present illustrative embodiment is implemented by a "contact switch" that is configured to detect the presence or absence of the reinforcing bar RB by physically bringing the actuating unit 810 into contact with the reinforcing bar RB. Instead of such an aspect, the detection unit 800 may be implemented by a switch that is configured to detect the presence or absence of the reinforcing bar RB in a non-contact manner, for example, using an optical sensor.

Figure 4:
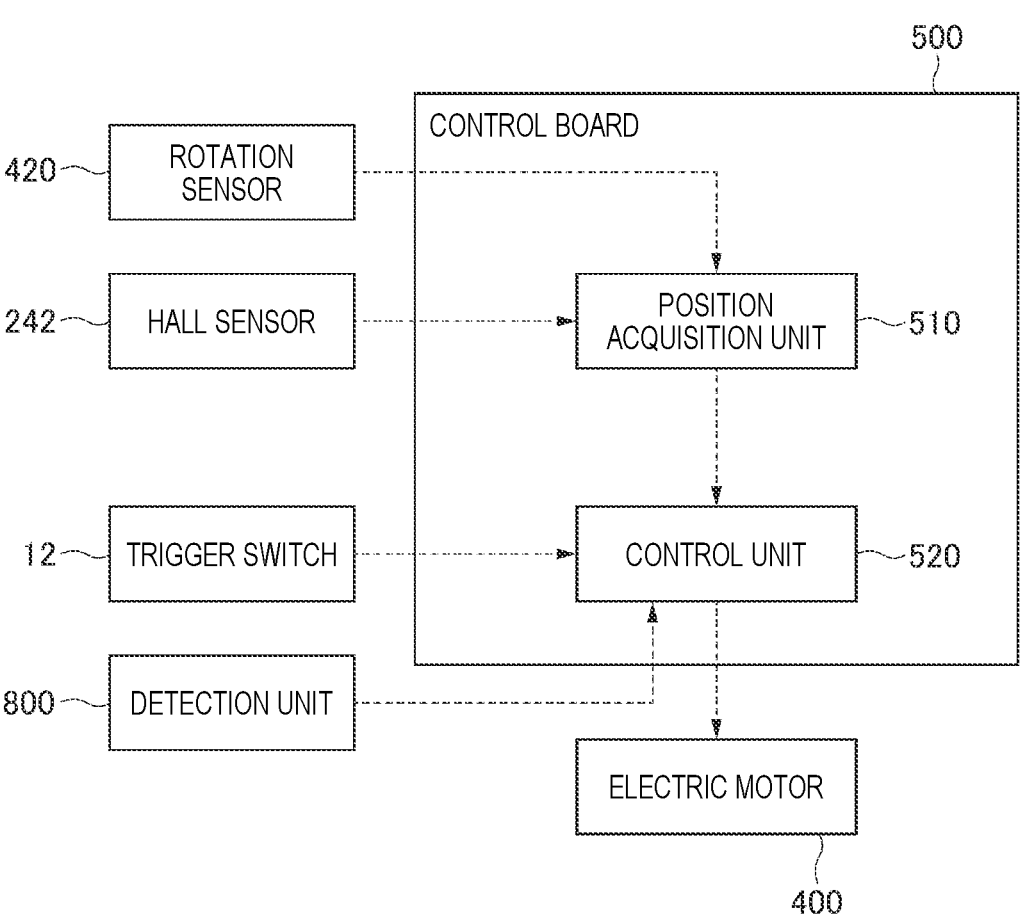
FIG. 4 is a diagram showing a configuration of a control board included in the cutting device according to the first illustrative embodiment.

A configuration of the control board 500 will be described with reference to FIG. 4. The control board 500 including the microcomputer includes a position acquisition unit 510 and a control unit 520 as elements representing functions of the control board 500.

The position acquisition unit 510 is configured to perform processing of acquiring a current position of the cutting blades 111. In the present illustrative embodiment, a count value of the pulse signal input from the rotation sensor 420 is calculated and acquired by the position acquisition unit 510 as the "current position" of the cutting blades 111, based on a time when the magnet 241 and the Hall sensor 242 face each other. The "current position" acquired by the position acquisition unit 510 may be any index that directly or indirectly indicates the current position of the cutting blades 111, and may be a value other than the count value of the pulse signal. For example, when the angle between the pair of cutting blades 111 is set as θ, a value of θ may be used as the above "current position".

In order to enable acquisition of the current position of the cutting blades 111, a reset operation may be performed when the cutting device 10 is started up. In the reset operation, for example, the electric motor 400 may be driven in a direction where the pair of cutting blades 111 change from the closed state to the opened state, and the electric motor 400 may be stopped at a time point when a detection signal from the Hall sensor 242 is input. By starting counting the pulse signals from this time point, the current position of the cutting blades 111 can be accurately acquired from then on.

The control unit 520 is configured to control the operation of the electric motor 400. The control unit 520 controls an opening and closing operation of the cutting blades 111 by adjusting magnitude of current supplied to the electric motor 400, for example, by PWM control. The control unit 520 also controls a braking operation of the cutting blades 111 by performing a so-called "short braking" that short-circuits some of a plurality of coils included in the electric motor 400 periodically or continuously.

Figure 5:
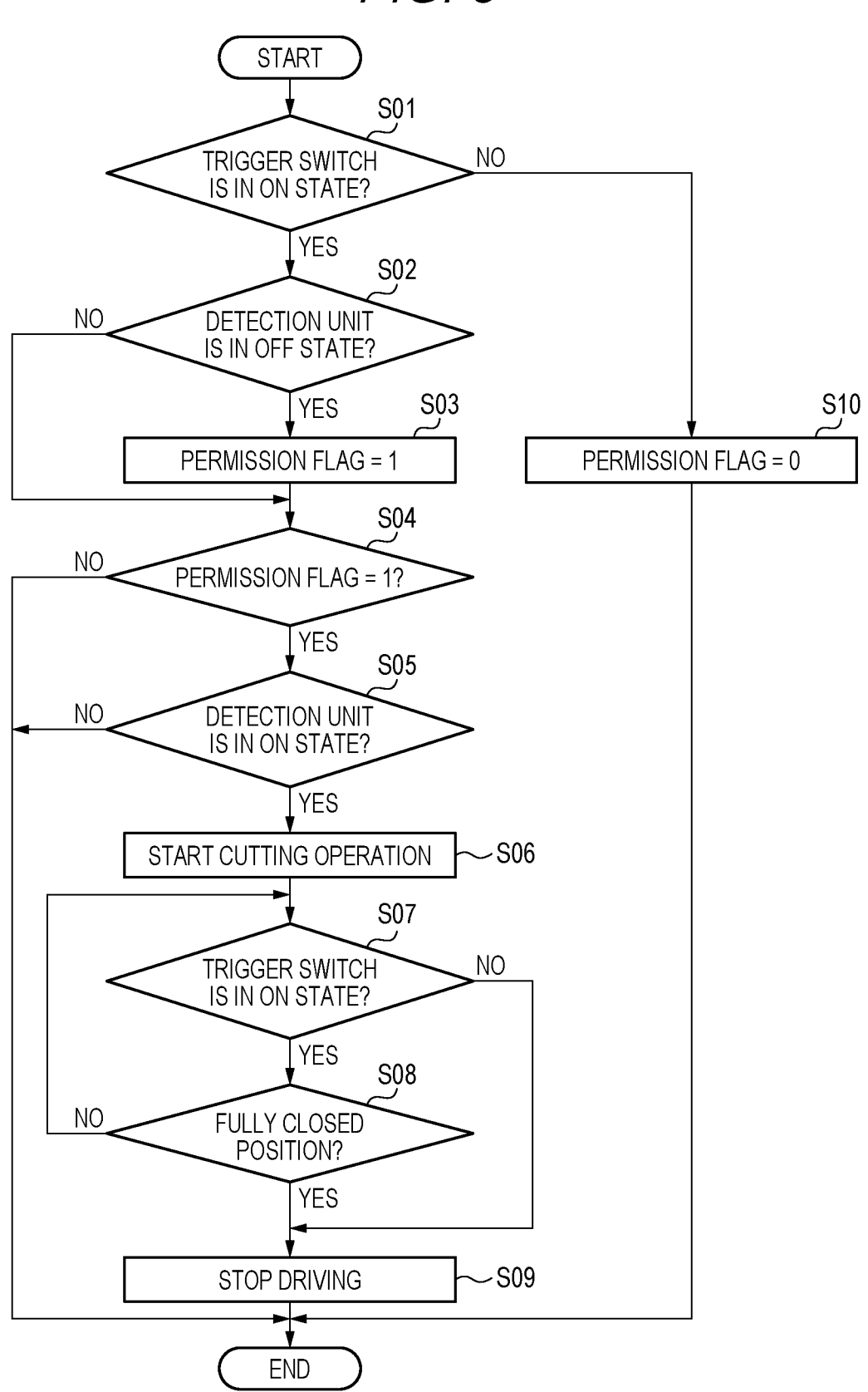
FIG. 5 is a flowchart showing a flow of processing executed by the control board according to the first illustrative embodiment.

Processing executed by the control board 500 will be described with reference to FIG. 5. A series of processing shown in a flowchart of FIG. 5 is repeatedly executed by the control board 500 every time a predetermined control period elapses after the above reset operation is completed.

In a first step S01 of the processing, it is determined by the control board 500, for example, whether the trigger switch 12 is in the ON state. If the trigger switch 12 is kept in the OFF state, the processing proceeds to step S10. In step S10, a value of a permission flag is set to 0. The "permission flag" is an internal variable for storing that the trigger switch 12 is turned on before the detection unit 800 is turned on. After step S10, the processing in FIG. 5 is temporarily ended.

If the trigger switch 12 is turned on in step S01, the processing proceeds to step S02. In step S02, it is determined by the control board 500, for example, whether the detection unit 800 is in the OFF state. If the detection unit 800 is in the OFF state, the processing proceeds to step S03. In step S03, the value of the permission flag is set to 1. Then, the processing proceeds to step S04. In step S02, if the detection unit 800 is in the ON state, the processing proceeds to step S04 without performing step S03.

In step S04, it is determined by the control board 500, for example, whether the value of the permission flag is 1. If the detection unit 800 is turned on first and the trigger switch 12 is then turned on, the value of the permission flag is 0. In this case, the processing in FIG. 5 is temporarily ended. If the trigger switch 12 is turned on first while the detection unit 800 is in the OFF state, the value of the permission flag is 1. Then, the processing proceeds to step S05.

In step S05, it is determined again by the control board 500, for example, whether the detection unit 800 is in the ON state. If the detection unit 800 is kept in the OFF state, the processing in FIG. 5 is temporarily ended. If the detection unit 800 is also turned on following the trigger switch 12, the processing proceeds to step S06. In step S06, the control unit 520 performs processing of driving the electric motor 400 to start operating the cutting blades 111 in a closing direction. Accordingly, cutting of the reinforcing bar is started.

In step S07 following step S06, it is determined by the control board 500, for example, whether the trigger switch 12 is kept in the ON state. If the trigger switch 12 is in the ON state, the processing proceeds to step S08. In step S08, it is determined by the control board 500, for example, whether the cutting blades 111 reach the fully closed position. In the present illustrative embodiment, the position where the pair of cutting blades 111 come into contact with each other is set as the "fully closed position", but the position immediately before the pair of cutting blades 111 come into contact with each other may be set as the "fully closed position". If the cutting blades 111 do not reach the fully closed position, the processing in and after step S07 is executed again while continuing the operation of the cutting blades 111 toward the fully closed position. If the cutting blades 111 reach the fully closed position, the processing proceeds to step S09.

In step S09, processing of stopping the operation of the cutting blades 111 is performed. Specifically, processing such as a short braking for braking the cutting blades 111 is started. In step S09, the cutting blades 111 may be stopped by simply stopping current supplied to the electric motor 400. Following the processing of stopping the operation of the cutting blades 111, the processing of returning the cutting blades 111 to a fully opened position may be automatically performed.

A timing when the processing of stopping the operation of the cutting blades 111 is started may be or differ from a timing when the cutting blades 111 reach the fully closed position as in the present illustrative embodiment. For example, the processing of stopping the operation of the cutting blades 111 may be started at a timing when the cutting blades 111 reach a predetermined position on a front side of the fully closed position.

If the trigger switch 12 is turned off in step S07, the processing proceeds to step S09. Accordingly, the operation of the cutting blades 111 is stopped without waiting for the cutting blades 111 to reach the fully closed position.

As described above, in the cutting device 10 according to the present illustrative embodiment, the control unit 520 is configured to start the operation of closing the pair of cutting blades 111 if both the trigger switch 12 (operation unit) and the detection unit 800 are turned on. Specifically, the operation of the cutting blades 111 is started only when the trigger switch 12 is first turned on and the detection unit 800 is then turned on. In such a configuration, the user can continuously cut the reinforcing bar by repeatedly inserting the reinforcing bar into the recesses 710 while keeping the trigger switch 12 turned on.

In a state where the reinforcing bar is not placed at an appropriate position (innermost sides of the recesses 710), since the detection unit 800 enters into the OFF state, the cutting blades 111 do not operate even if the trigger switch 12 is turned on. Accordingly, it is possible to prevent a situation in which the operation of the cutting blades 111 is started while a positional relationship between the cutting blades 111 and the reinforcing bar is inappropriate.

Even when the reinforcing bar is placed at an appropriate position and the detection unit 800 enters into the ON state, the cutting blades 111 still do not operate if the trigger switch 12 is kept in the OFF state. Accordingly, it is possible to prevent a situation in which the cutting blades 111 operate against the will of the user.

In a period where the control unit 520 according to the present illustrative embodiment performs an operation of closing the pair of cutting blades 111, if the trigger switch 12 is turned off, the processing proceeds to step S09 from step S07, and the control unit 520 stops the operation of closing the cutting blades 111. On the other hand, in the above period, even if the detection unit 800 is turned off, the cutting blades 111 continue to operate without stopping.

After the cutting of the reinforcing bar is started, there is a possibility that the detection unit 800 will be turned off due to an influence of deformation of the reinforcing bar, for example. In such a case, it is often preferable to continue the cutting without stopping the operation of the cutting blades 111. Therefore, in the present illustrative embodiment, as described above, even if the detection unit 800 is turned off during the cutting, the cutting blades 111 are not stopped.

Figure 6:
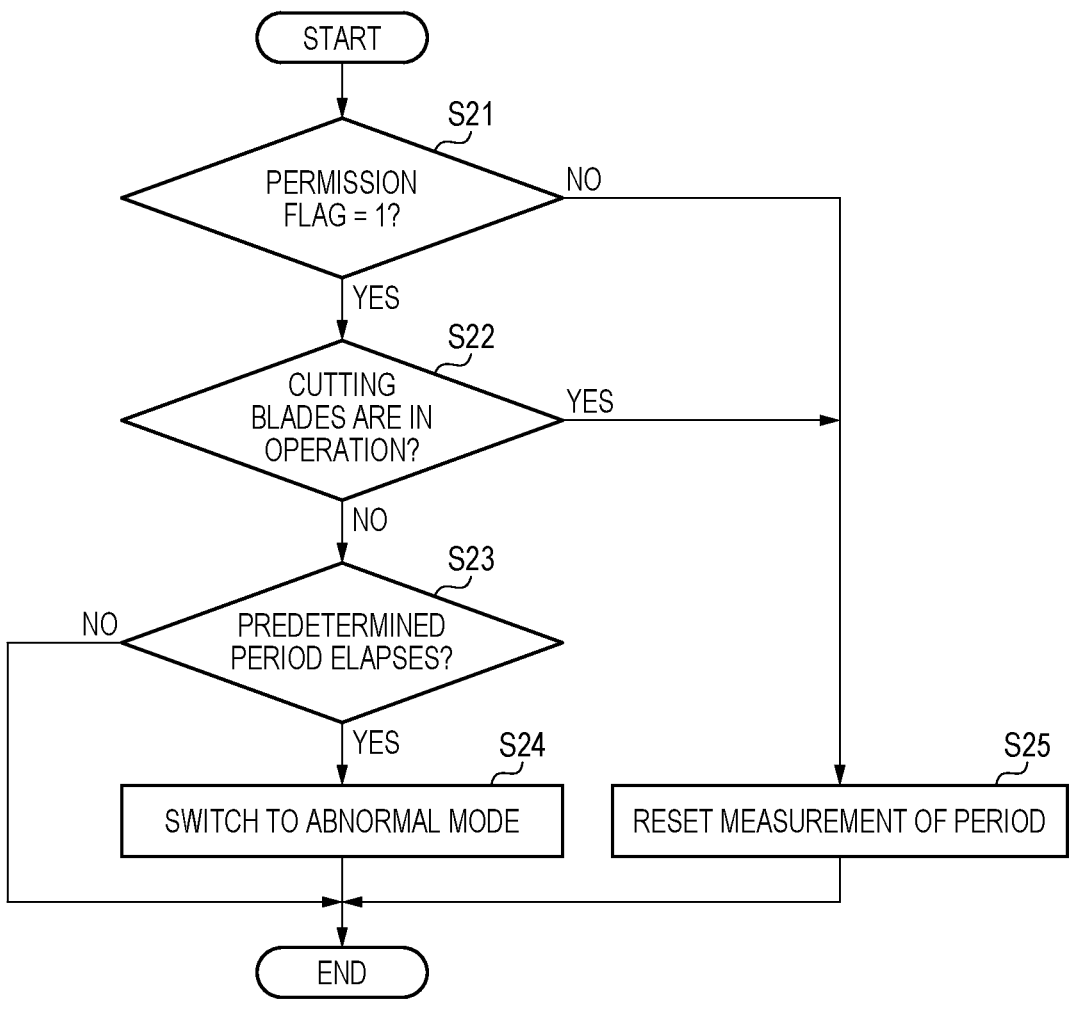
FIG. 6 is a flowchart showing a flow of processing executed by the control board according to the first illustrative embodiment.

A series of processing shown in FIG. 6 is repeatedly executed by the control board 500 in parallel with the series of the processing shown in FIG. 5. In a first step S21, it is determined by the control board 500, for example, whether the value of the permission flag is 1. If the value of the permission flag is 0, the processing proceeds to step S25. In step S25, measurement of a period is reset. The "period" described here refers to a period from when the value of the permission flag changes to 1 until the cutting blades 111 start operating, and is measured by a timer of the control board 500. After step S25, the processing in FIG. 6 is temporarily ended.

In step S21, if the permission flag is 1, the processing proceeds to step S22. The above period starts to be measured from a time point when the processing first proceeds to step S22. In step S22, it is determined by the control board 500, for example, whether the cutting blades 111 are in operation. If the cutting blades 111 are in operation, the processing proceeds to step S25. If the operation of the cutting blades 111 is not started, the processing proceeds to step S23.

In step S23, it is determined by the control board 500, for example, whether a predetermined period from a time point when the processing first proceeds to step S22 elapses. If the predetermined period does not elapse, the processing in FIG. 6 is temporarily ended. If the predetermined time elapses, the processing proceeds to step S24.

Proceeding to step S24 means that the predetermined period elapses without the detection unit 800 being turned on after the trigger switch 12 is turned on. Since such a situation is unlikely to occur during normal work, there is a high possibility that some kind of abnormal situation occurs. Therefore, in step S24, processing of switching to an abnormal mode is performed. In the abnormal mode, the control unit 520 does not operate the cutting blades 111 even if both the trigger switch 12 and the detection unit 800 are subsequently turned on. In this case, the user may be notified of the switching to such an abnormal mode by, for example, lighting a lamp.

In the present illustrative embodiment, the operation of the cutting blades 111 is started only when the trigger switch 12 is first turned on and the detection unit 800 is then turned on. This order may be changed as appropriate. For example, instead of the series of processing shown in FIG. 5, a series of processing shown in FIG. 7 may be executed. In a modification of FIG. 7, steps S01, S02, and S05 in FIG. 5 are replaced with steps S31, S32, and S35, respectively.

In step S31, it is determined by the control board 500, for example, whether the detection unit 800 is in the ON state. If the detection unit 800 is in the ON state, the processing proceeds to step S32. If the detection unit 800 is in the OFF state, the processing proceeds to step S10. In step S32, it is determined by the control board 500, for example, whether the trigger switch 12 is in the OFF state. If the trigger switch 12 is in the OFF state, the processing proceeds to step S03. If the trigger switch 12 is in the ON state, the processing proceeds to step S04.

The permission flag in this modification is used as an internal variable to store that the detection unit 800 is turned on before the trigger switch 12 is turned on. In the modification, the operation of the cutting blades 111 is started only when the detection unit 800 is first turned on and the trigger switch 12 is then turned on.

Figure 7:
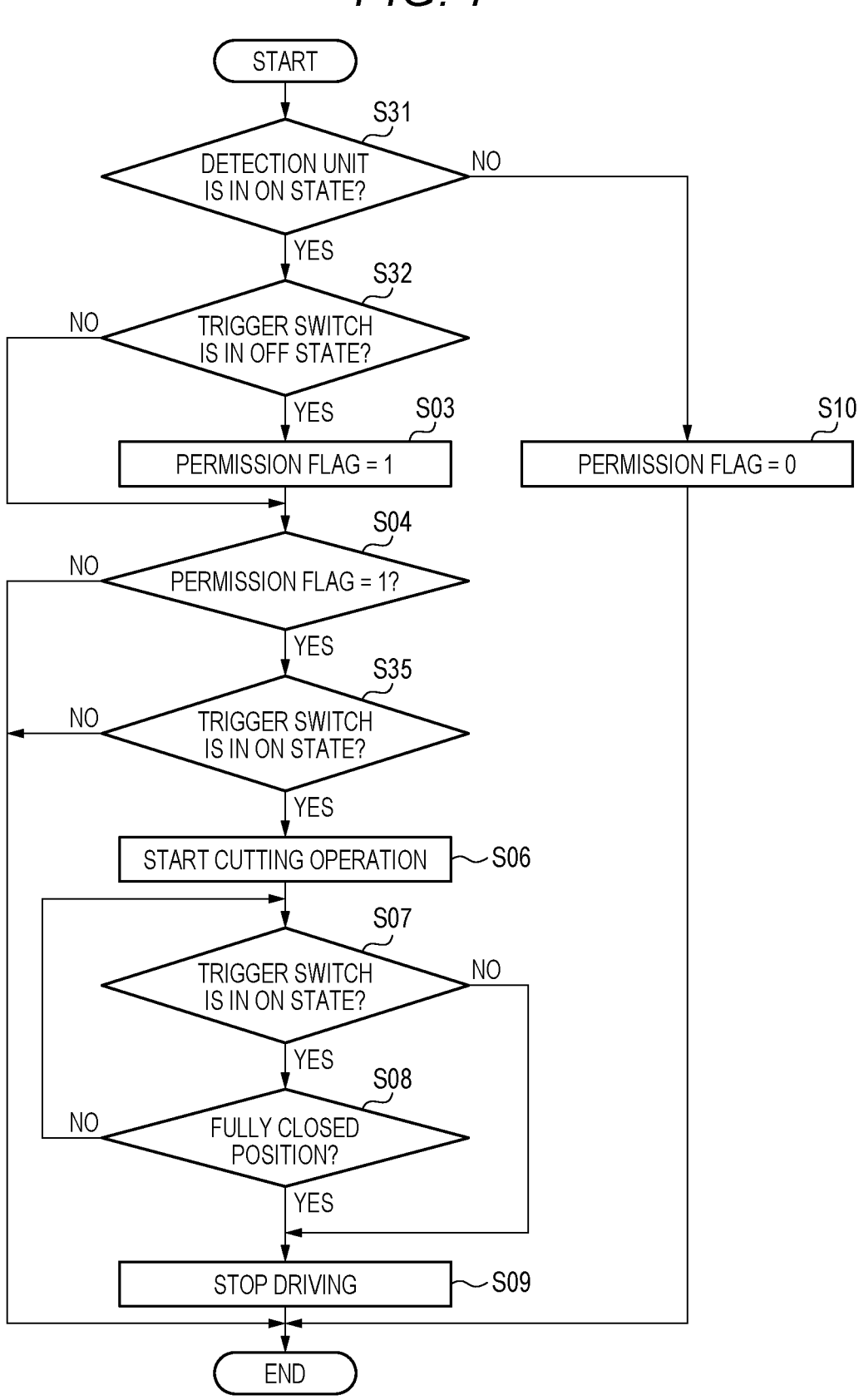
FIG. 7 is a flowchart showing a flow of processing executed by a control board according to a modification of the first illustrative embodiment.

Also in this modification, the processing in FIG. 6 is executed in parallel with the processing in FIG. 7. Accordingly, after the detection unit 800 is turned on, if the predetermined period elapses without the trigger switch 12 being turned on, the processing proceeds to step S24 and switching to the abnormal mode is performed. That is, the control unit 520 does not operate the cutting blades 111 even if both the trigger switch 12 and the detection unit 800 are subsequently turned on.

In this way, when the cutting blades 111 are stopped, if the predetermined period elapses with only one of the trigger switch 12 and the detection unit 800 being kept in the ON state, the control unit 520 does not start the operation of closing the pair of cutting blades 111 even if both the trigger switch 12 and the detection unit 800 are subsequently turned on.

Figure 8:
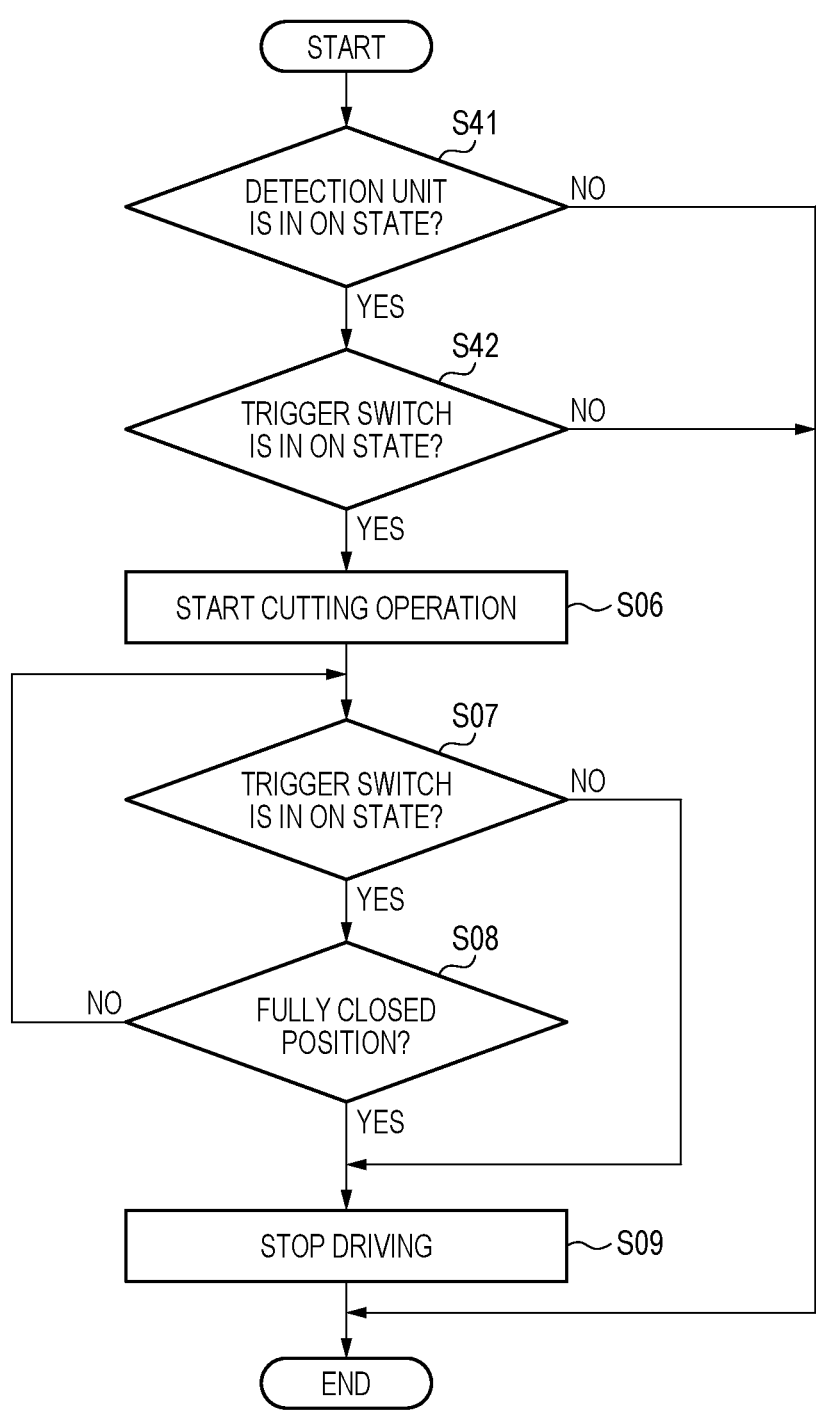
FIG. 8 is a flowchart showing a flow of processing executed by a control board according to another modification of the first illustrative embodiment.

Instead of the series of processing shown in FIG. 5, a series of processing shown in FIG. 8 may be executed.

In a first step S41 in FIG. 8, it is determined by the control board 500, for example, whether the detection unit 800 is in the ON state. If the detection unit 800 is in the ON state, the processing proceeds to step S42. If the detection unit 800 is in the OFF state, the processing in FIG. 8 is temporarily ended.

In step S42, it is determined by the control board 500, for example, whether the trigger switch 12 is in the ON state. If the trigger switch 12 is in the ON state, the processing proceeds to step S06. If the trigger switch 12 is in the OFF state, the processing in FIG. 8 is temporarily ended. The processing executed in and after step S06 is the same as that in the first illustrative embodiment of FIG. 5.

In this modification, if both the trigger switch 12 and the detection unit 800 are turned on, the control unit 520 always starts operating the cutting blades 111 regardless of the order. Also in this modification, if the predetermined period elapses with only one of the trigger switch 12 and the detection unit 800 being kept in the ON state, the processing of switching to the abnormal mode may be performed.

Figure 9:
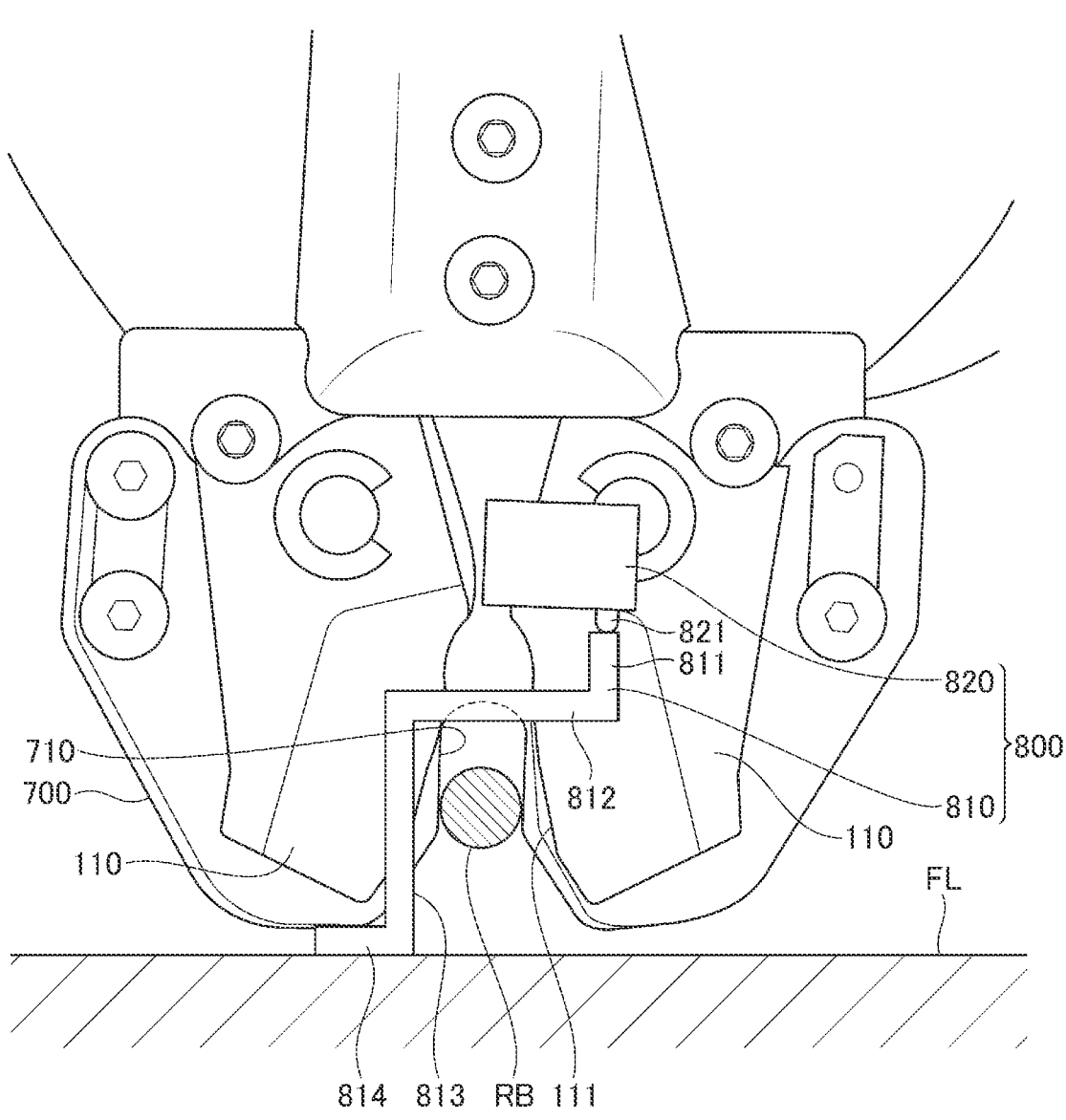
FIG. 9 is a diagram showing a configuration of a detection unit included in a cutting device according to a second illustrative embodiment.

A second illustrative embodiment is described. In the following, points different from the first illustrative embodiment will be mainly described, and descriptions of points common to those of the first illustrative embodiment will be omitted as appropriate. As shown in FIG. 9, the present illustrative embodiment differs from the first illustrative embodiment in a shape of the actuating unit 810 included in the detection unit 800. Processing executed by the control board 500 in the present illustrative embodiment is the same as the processing in the modification shown in FIG. 7 or 8 instead of the processing shown in FIG. 5.

Figure 10:
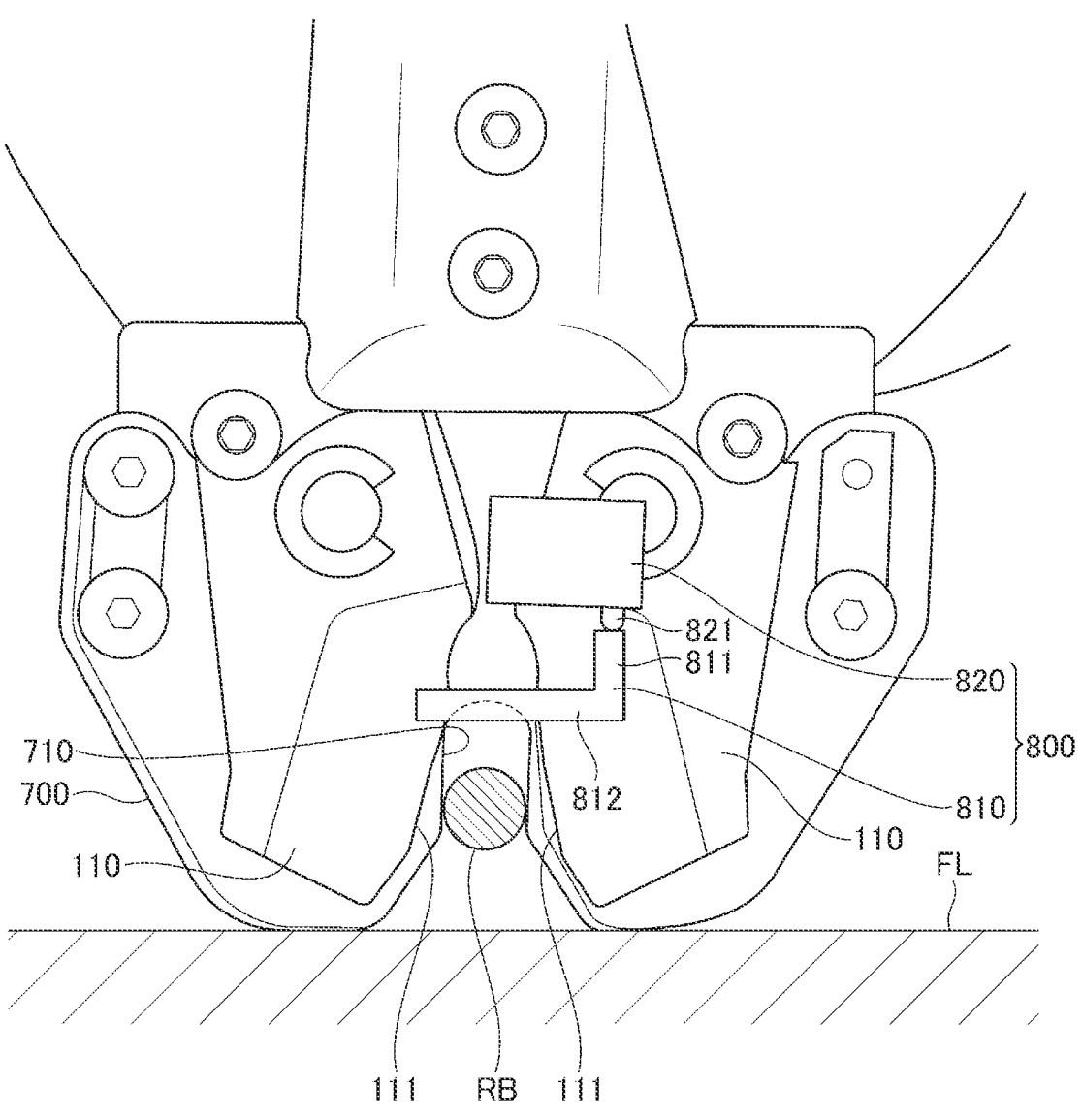
FIG. 10 is a diagram for illustrating a problem when cutting a reinforcing bar near a floor.

FIG. 10 illustrates a situation in which the cutting device 10 according to the first illustrative embodiment is provided to cut the reinforcing bar RB placed near a floor FL. In this case, the front ends of the guide plates 700 abut the floor FL before the reinforcing bar RB comes into contact with the actuating unit 810 on the back side of the recesses 710. Since the detection unit 800 is not in the ON state, the cutting blades 111 do not operate even if the user turns on the trigger switch 12. That is, even though the reinforcing bar RB is between the cutting blades 111, the cutting blades 111 cannot cut the reinforcing bar RB. Therefore, the cutting device 10 according to the present illustrative embodiment solves the above problem by devising the shape of the actuating unit 810. A similar problem may also occur when the reinforcing bar RB is placed near a wall or the like that is perpendicular to the ground.

As shown in FIG. 9, the actuating unit 810 according to the present illustrative embodiment further includes a third portion 813 and a fourth portion 814 in addition to the first portion 811 and the second portion 812.

The third portion 813 is a portion that extends linearly from an end portion, opposite to the first portion 811, of the second portion 812 toward a front end side. The fourth portion 814 is a portion that extends linearly from an end portion on the front end side of the third portion 813 in a direction perpendicular to the third portion 813.

When the actuating unit 810 is not in contact with the reinforcing bar RB or the floor FL, the fourth portion 814 of the actuating unit 810 protrudes further toward the front end side than the front end of the guide plate 700. A protrusion amount is approximately equal to an operation stroke of the movable portion 821. If the cutting device 10 is not provided with the guide plates 700, the fourth portion 814 may be made to protrude from the front end of the cutting blade 111 by the above stroke.

As shown in FIG. 9, when the cutting device 10 is moved toward the floor FL with clamping the reinforcing bar RB by the cutting blades 111, the fourth portion 814 comes into contact with the floor before the guide plate 700 does. When the cutting device 10 is further moved toward the floor FL, the actuating unit 810 and the movable portion 821 are pushed in by a force from the floor FL, and the detection unit 800 is turned on.

In this way, in the present illustrative embodiment, even if the reinforcing bar RB does not come into contact with the actuating unit 810, the actuating unit 810 is operated by the force from the floor FL, and the detection unit 800 is turned on. Therefore, if the user turns on the trigger switch 12 subsequently, the cutting of the reinforcing bar RB is started.

The present illustrative embodiment has been described above with reference to specific examples. However, the present disclosure is not limited to these specific examples. Design changes made by those skilled in the art as appropriate to these specific examples are also included within the scope of the present disclosure as long as the changes have characteristics of the present disclosure. Elements included in each of the specific examples described above, and arrangement, conditions, shapes, and the like of the elements are not limited to those illustrated, and can be changed as appropriate. The elements included in each of the specific examples described above can be appropriately combined as long as no technical contradiction occurs.

What is claimed is:

1. An electric cutting device, comprising:
a pair of cutting blades configured to clamp and cut an object;

an electric motor configured to generate a driving force necessary for operating the cutting blades;
a controller configured to control an operation of the electric motor;
an operation switch having an ON state and an OFF state configurable by a user operation; and
a detector configured to:
enter into an ON state in a case where the object is present between the pair of cutting blades; and
enter into an OFF state in a case where the object is not present,
wherein the controller is configured to execute an operation of closing the pair of cutting blades in a case where both the operation switch and the detector are in the ON state, and
wherein in a period where the operation of closing the pair of cutting blades is performed, the controller is configured to:
stop the operation of closing the pair of cutting blades when the operation switch enters into the OFF state; and
continue the operation of closing the pair of cutting blades when the detector enters into the OFF state.

2. The cutting device according to claim 1, wherein in a state where one of the operation switch and the detector is in the ON state, the controller is configured to:
in response to another one of the operation switch and the detector being turned from the OFF state to the ON state, start the operation of closing the pair of cutting blades.

3. The cutting device according to claim 2, wherein in a state where the operation switch is in the ON state, the controller is configured to:
in response to the detector being turned from the OFF state to the ON state, start the operation of closing the pair of cutting blades.

4. The cutting device according to claim 2, wherein in a state where the detector is in the ON state, the controller is configured to:
in response to the operation switch being turned from the OFF state to the ON state, start the operation of closing the pair of cutting blades.

5. The cutting device according to claim 1, wherein the detector comprises:
an actuator configured to come into contact with the object inserted between the pair of cutting blades and be actuated in response to a force from the object.

6. The cutting device according to claim 5, wherein the actuator protrudes toward a front end side beyond the cutting blades.

7. An electric cutting device, comprising:
a pair of cutting blades configured to clamp and cut an object;
an electric motor configured to generate a driving force necessary for operating the cutting blades;
a controller configured to control an operation of the electric motor;
an operation switch having an ON state and an OFF state configurable by a user operation; and
a detector configured to:
enter into an ON state in a case where the object is present between the pair of cutting blades; and
enter into an OFF state in a case where the object is not present, wherein the controller is configured to execute an operation of closing the pair of cutting blades in a case where both the operation switch and the detector are in the ON state, and wherein in a state where the cutting blades are stopped, in a case where only one of the operation switch and the detector remains in the ON state for a predetermined period, the controller is configured to:

even if both the operation switch and the detector are subsequently turned to the ON state, not to start the operation of closing the pair of cutting blades.

\* \* \* \* \*